US012789792B2

United States Patent

Sato

(10) Patent No.: US 12,789,792 B2
(45) Date of Patent: Nov. 10, 2026

(54) CONTROLLER AND CONTROL METHOD FOR PERFORMING DECELERATION CONTROL OF A SADDLED VEHICLE

(71) Applicant: Robert Bosch GmbH, Stuttgart (DE)

(72) Inventor: Akira Sato, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 238 days.

(21) Appl. No.: 18/574,112

(22) PCT Filed: Jun. 22, 2022

(86) PCT No.: PCT/IB2022/055781

§ 371 (c)(1),
(2) Date: Dec. 26, 2023

(87) PCT Pub. No.: WO2022/269505

PCT Pub. Date: Dec. 29, 2022

(65) Prior Publication Data

US 2024/0317219 A1 Sep. 26, 2024

(30) Foreign Application Priority Data

Jun. 25, 2021 (JP) ................................ 2021-105861

(51) Int. Cl.
*B60W 30/095* (2012.01)
*B60W 10/06* (2006.01)
(Continued)

(52) U.S. Cl.
CPC ............ *B60W 30/09* (2013.01); *B60W 10/06* (2013.01); *B60W 10/188* (2013.01);
(Continued)

(58) Field of Classification Search
CPC .... B60W 30/09; B60W 10/06; B60W 10/188; B60W 30/0956
See application file for complete search history.

(56) References Cited

U.S. PATENT DOCUMENTS

2010/0042280 A1* 2/2010 Cominetti .............. B62K 11/04 701/22
2017/0028972 A1* 2/2017 Kajiyama ............. B60T 8/3225
(Continued)

FOREIGN PATENT DOCUMENTS

CN 111806609 A * 10/2020 ............... B62H 1/12
EP 3632783 A1 4/2020
(Continued)

OTHER PUBLICATIONS

Machine Translation of Foreign Reference: CN 111806609 A—Guo et al. (Year: 2020).*
(Continued)

*Primary Examiner* — Scott A Browne
*Assistant Examiner* — Rami Nabih Bedewi
(74) *Attorney, Agent, or Firm* — Michael Best & Friedrich LLP

(57) ABSTRACT

A controller and method for a controller that maneuvers a saddled vehicle including a first operation unit that accepts a brake operation. The controller controls a deceleration of the saddled vehicle and determines a possibility of collision. The controller initiates a first deceleration control according to a first operation in which the rider operates a second operation unit to change a state of the second operation unit from a reference state to a different state and terminates the first deceleration control according to a second operation in which the rider operates the second operation unit to return the state to the reference state during the first deceleration control. The controller executes a second deceleration control based on determination results at least one point in a period from the termination of the first deceleration control to an initiation of operating the first operation unit.

10 Claims, 6 Drawing Sheets

(51) Int. Cl.
*B60W 10/188* (2012.01)
*B60W 30/09* (2012.01)
*B60W 30/14* (2006.01)

(52) U.S. Cl.
CPC ...... *B60W 30/0956* (2013.01); *B60W 30/146* (2013.01); *B60W 2300/36* (2013.01); *B60W 2510/0604* (2013.01)

(56) References Cited

U.S. PATENT DOCUMENTS

| | | | | |
|---|---|---|---|---|
| 2018/0326867 | A1* | 11/2018 | Yoneda | B60L 7/26 |
| 2020/0231241 | A1* | 7/2020 | Knitt | B60L 50/60 |
| 2020/0276961 | A1* | 9/2020 | Kaneta | B60T 8/26 |
| 2020/0391732 | A1* | 12/2020 | Kaneta | B60W 30/09 |

FOREIGN PATENT DOCUMENTS

| | | | |
|---|---|---|---|
| EP | 3663144 | A1 | 6/2020 |
| EP | 3734050 | A1 | 11/2020 |
| JP | 2009116882 | A | 5/2009 |
| WO | 2020194708 | A1 | 10/2020 |

OTHER PUBLICATIONS

International Search Report and Written Opinion for Application No. PCT/IB2022/055781 dated Oct. 5, 2022 (11 pages).

* cited by examiner

[FIG. 1]
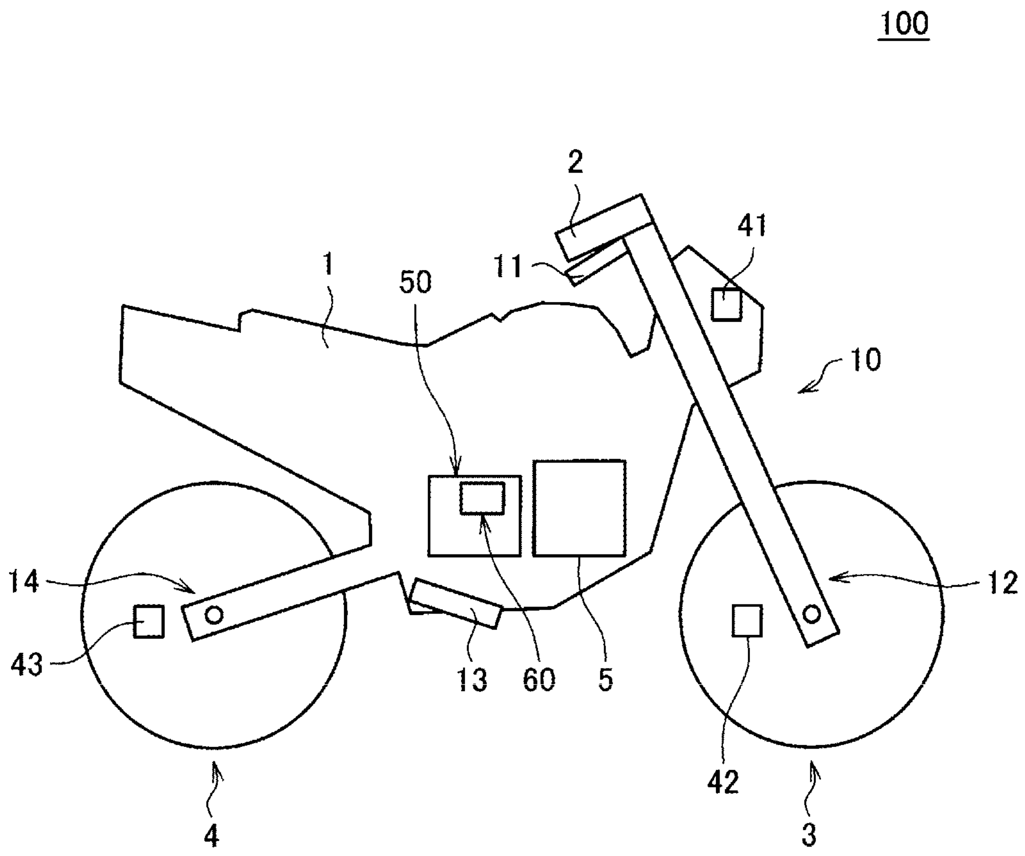

[FIG. 2]
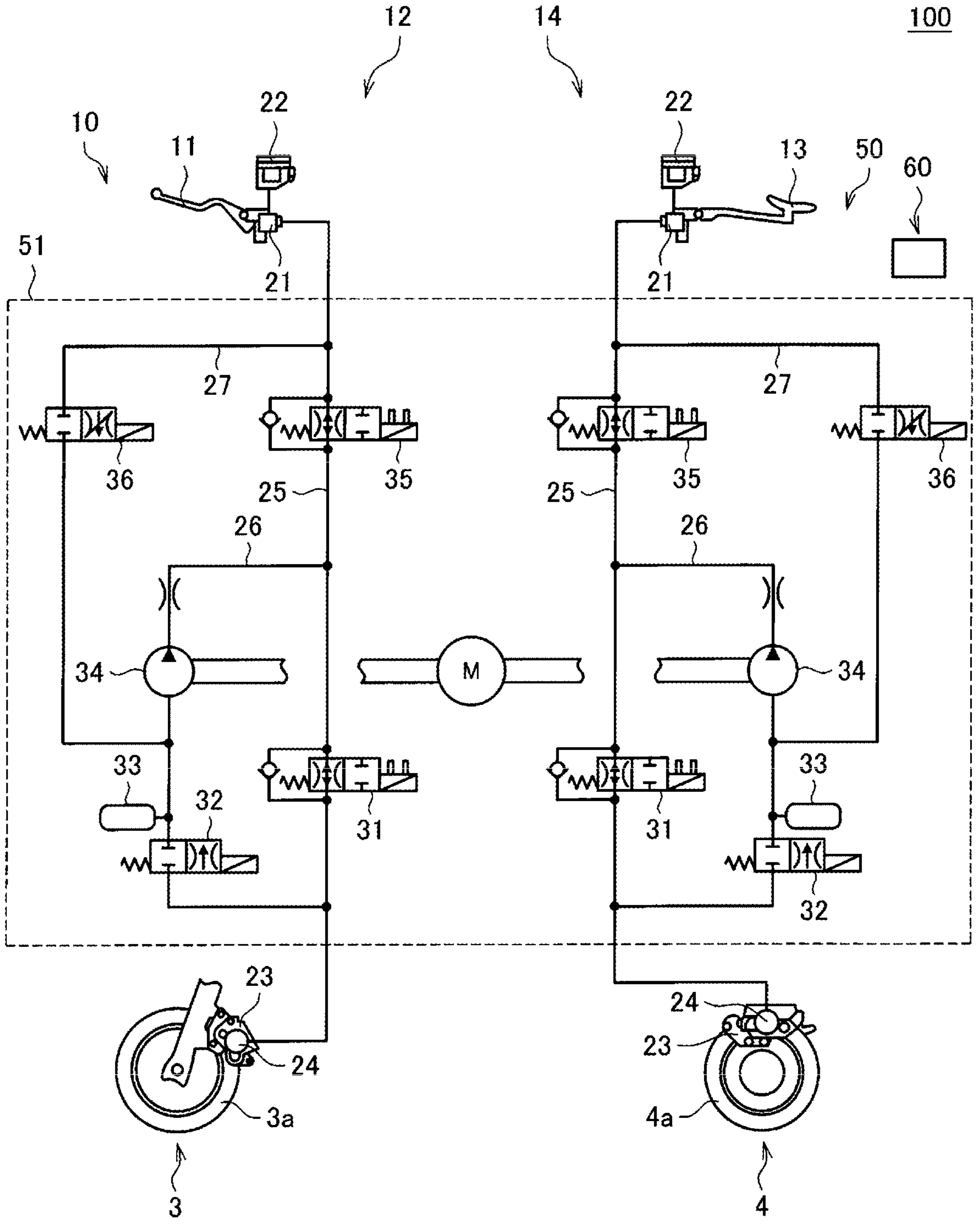

[FIG. 3]
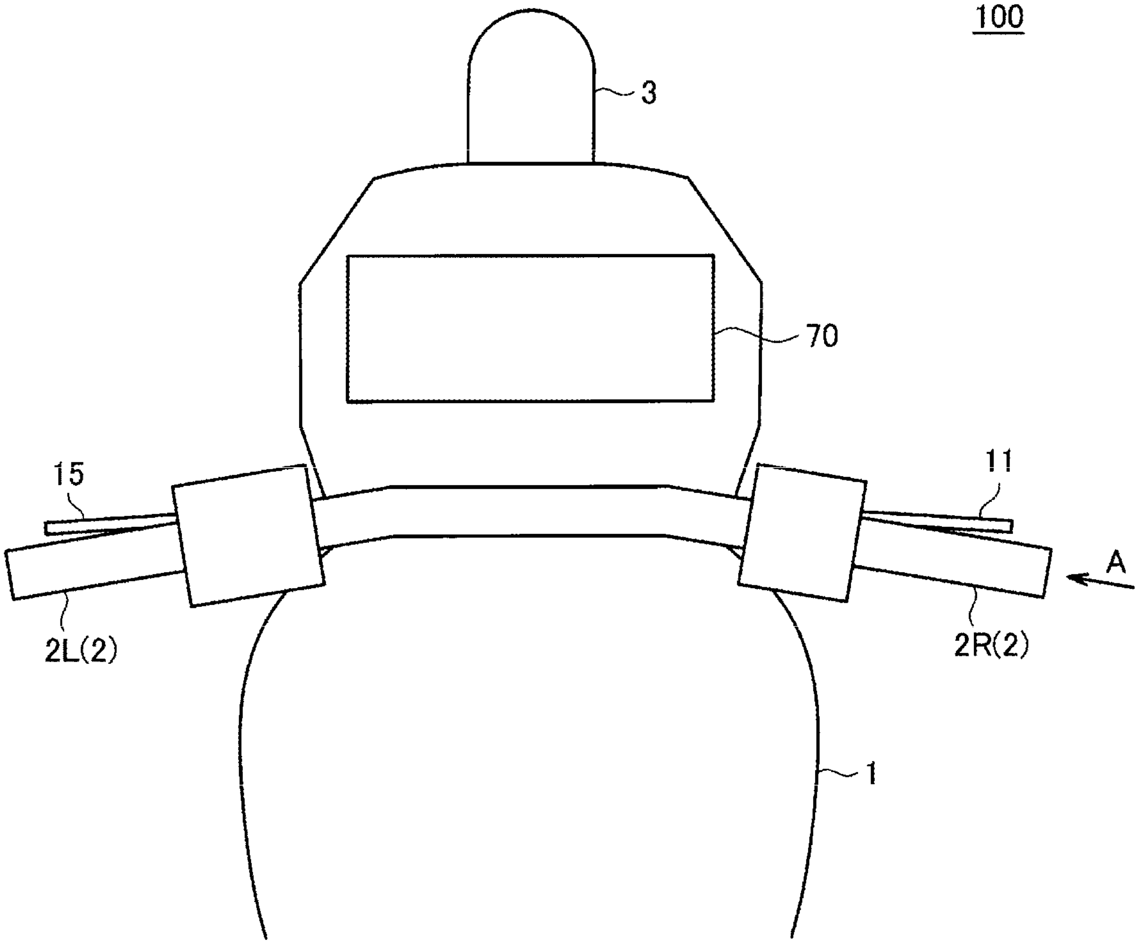
[FIG. 4]
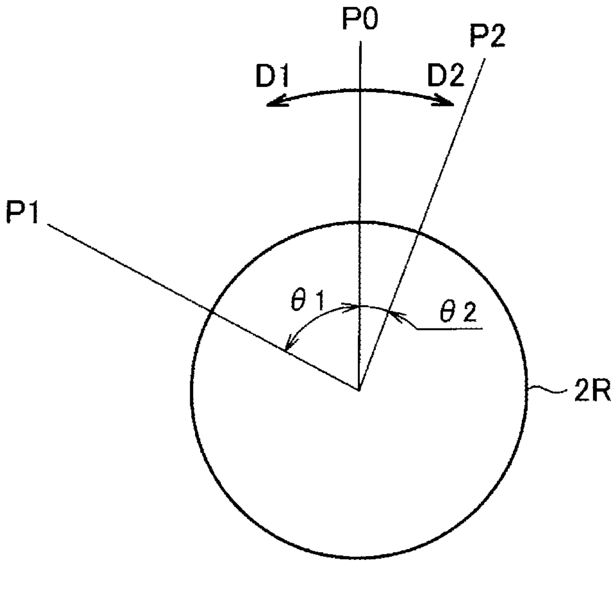

[FIG. 5]
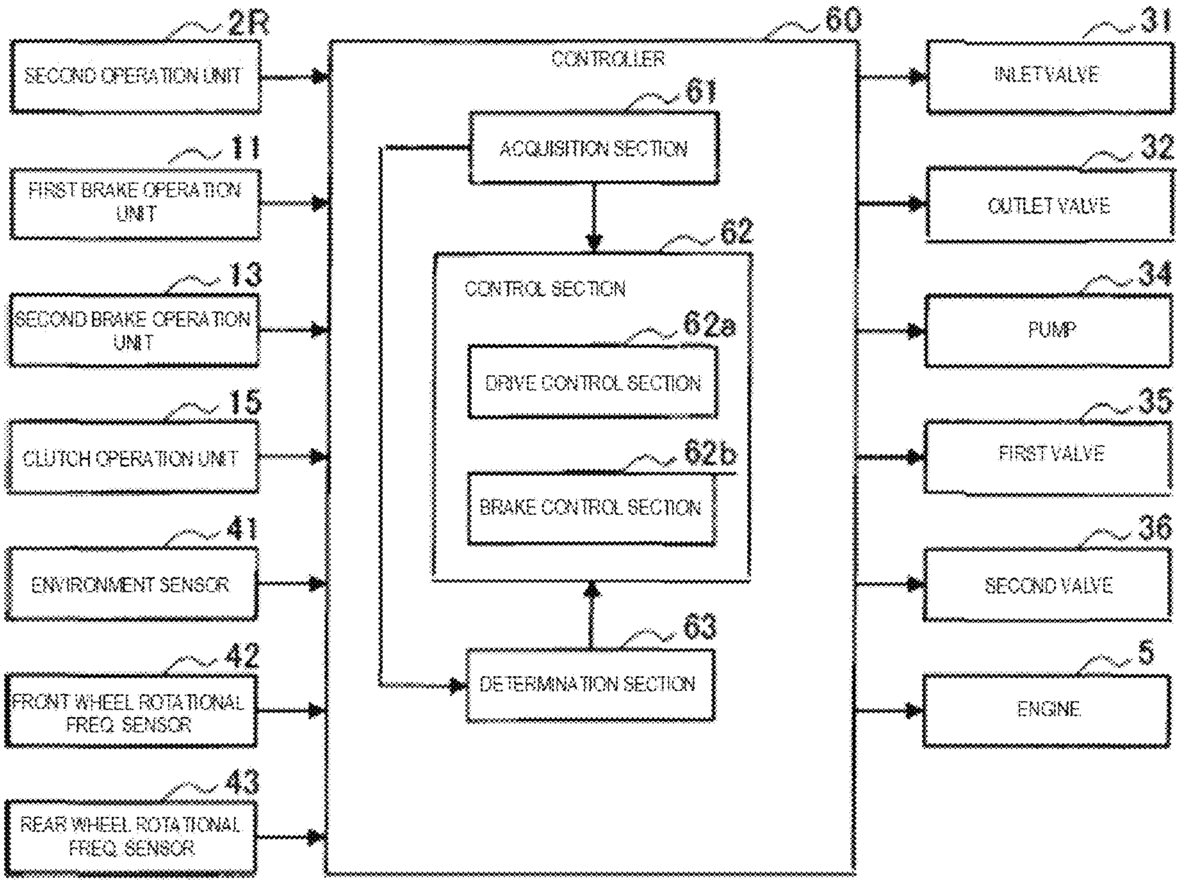

[FIG. 6]
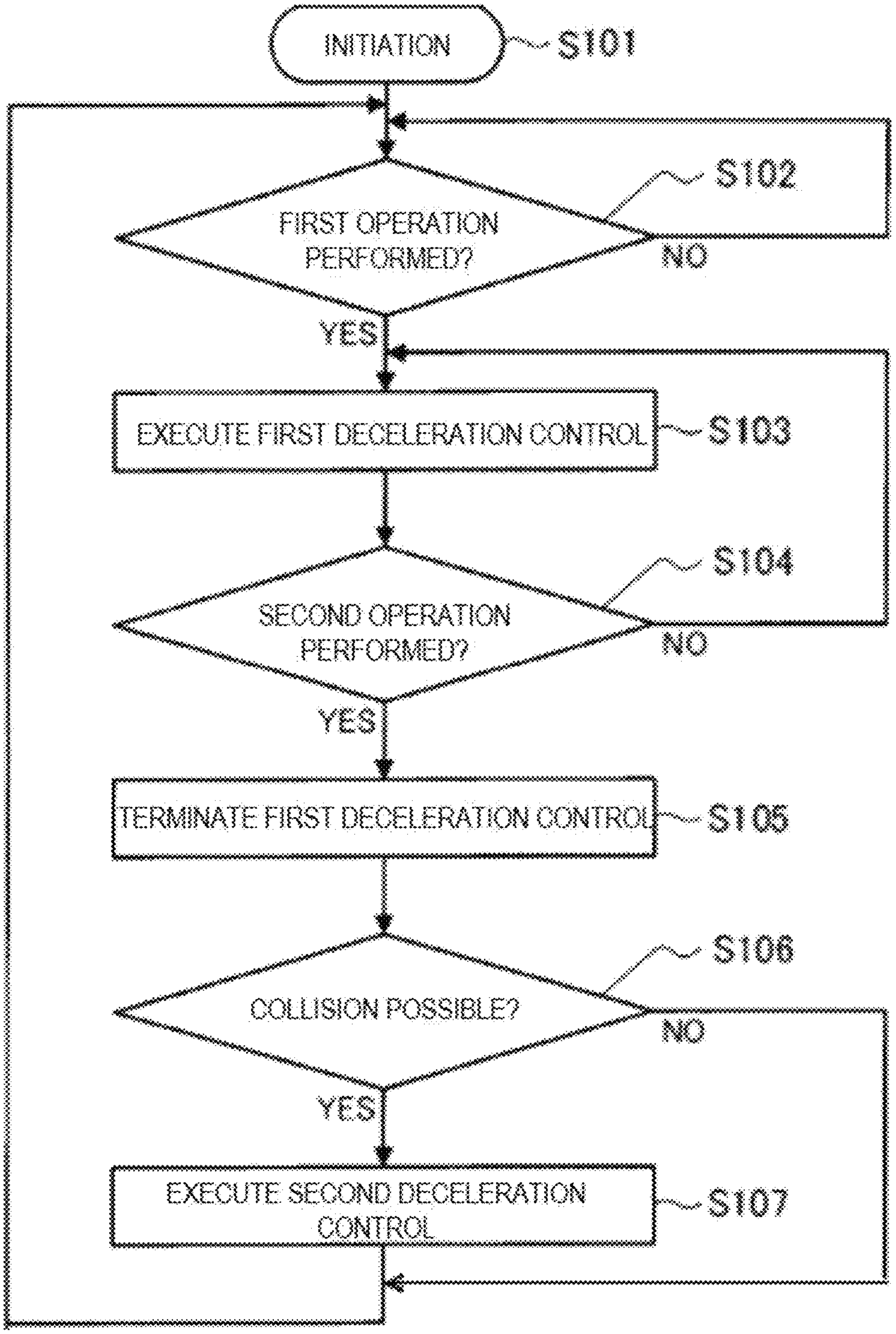

[FIG. 7]
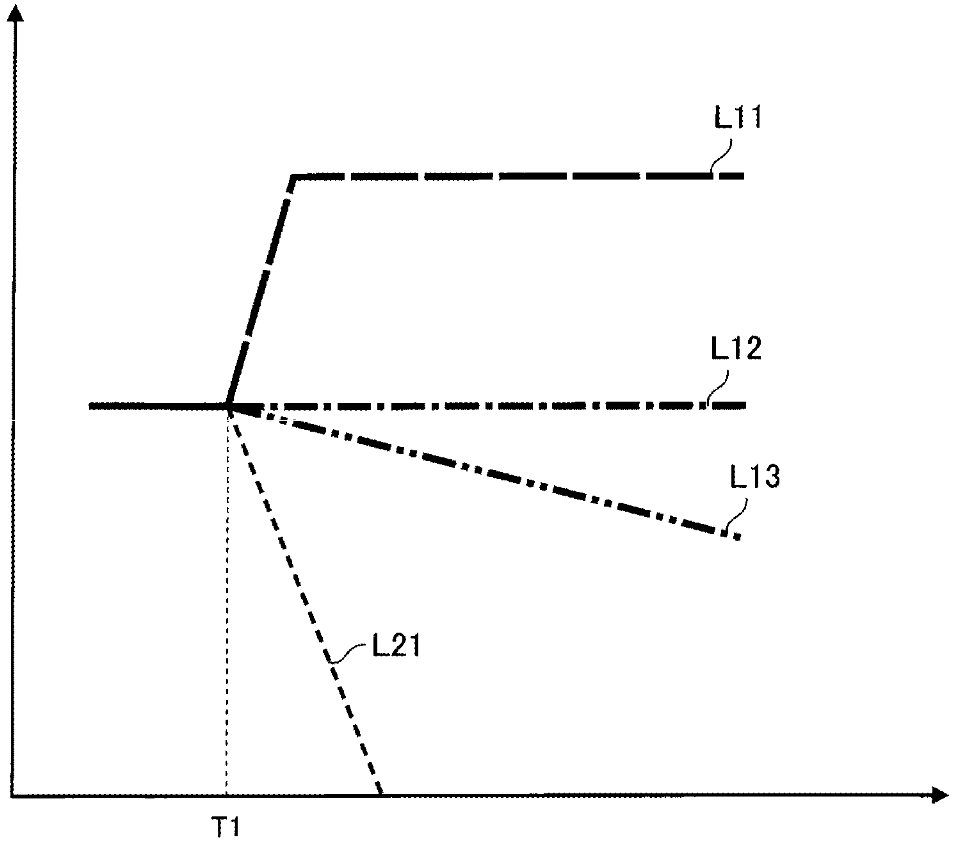

CONTROLLER AND CONTROL METHOD FOR PERFORMING DECELERATION CONTROL OF A SADDLED VEHICLE

BACKGROUND

The present disclosure relates to a controller and a control method appropriately improving safety of a saddled vehicle.

Various techniques are known to improve safety of saddled vehicles.

For example, JP 2009-116882 A discloses a driver assistance system for a motorcycle. The driver assistance system has a sensor that detects an object located in front of a saddled vehicle in a travel direction of the saddled vehicle or substantially in the travel direction. The driver assistance system notifies a rider of the saddled vehicle that the motorcycle is approaching the object in appropriately based on the detection results of the sensor.

In order to improve the safety of the saddled vehicle, it is considered to execute a deceleration control when a rider of the saddled vehicle performs a specific operation. In the deceleration control, a deceleration of the saddled vehicle is controlled. However, the rider may cancel the specific operation and performs a braking operation using a device such as a brake lever. In this case, the deceleration may be decreased excessively during a time duration from the cancelation of the deceleration control to an initiation of the braking operation. The excess decrease of the deceleration results in deterioration of safety.

SUMMARY

The present disclosure addresses the above-described issues. Thus, it is an objective of the present disclosure to provide a controller and a control method improving safety of saddled vehicles suitably.

As one aspect of the present disclosure, a controller maneuvers a saddled vehicle that includes a first operation unit configured to accept a brake operation by a rider. The controller has a control section and a determination section. The control section controls a deceleration of the saddled vehicle. The determination section determines possibility of causing a collision of the saddled vehicle based on a surrounding environment information of the saddled vehicle. The control section initiates a first deceleration control, to control the deceleration, according to a first operation. The first operation is an operation in which the rider operates a second operation unit to change a state of the second operation unit from a reference state to a different state that is different from the reference state. The second operation unit is different from the first operation unit. The control section terminates the first deceleration control according to a second operation. The second operation is an operation in which the rider operates the second operation unit to return the state to the reference state during the first deceleration control. The control section executes a second deceleration control, to control the deceleration, based on determination results of the determination section about the possibility of causing the collision, the control section executes the second deceleration at least one point in a period from the termination of the first deceleration control to an initiation of operating the first operation unit by the rider.

As one aspect of the present disclosure, a control method is provided for maneuvering a saddled vehicle that includes a first operation unit accepting a brake operation by a rider. The control method includes controlling, using a control section of a controller, a deceleration of the saddled vehicle; and determining, using a determination section of the controller, possibility of causing a collision of the saddled vehicle based on a surrounding environment information of the saddled vehicle. The control section initiates a first deceleration control, to control the deceleration, according to a first operation. The first operation is an operation in which the rider operates a second operation unit to change a state of the second operation unit from a reference state to a different state that is different from the reference state. The second operation unit is different from the first operation unit. The control section terminates the first deceleration control according to a second operation. The second operation is an operation in which the rider operates the second operation unit to return the state to the reference state during the first deceleration control. The control section executes a second deceleration control, to control the deceleration, based on determination results of the determination section about the possibility of causing the collision. the control section executes the second deceleration at least one point in a period from the termination of the first deceleration control to an initiation of operating the first operation unit by the rider.

According to the controller and the control method of the present disclosure, a controller maneuvers a saddled vehicle that includes a first operation unit configured to accept a brake operation by a rider. The controller has a control section and a determination section. The control section controls a deceleration of the saddled vehicle. The determination section determines possibility of causing a collision of the saddled vehicle based on a surrounding environment information of the saddled vehicle. The control section initiates a first deceleration control, to control the deceleration, according to a first operation. The first operation is an operation in which the rider operates a second operation unit to change a state of the second operation unit from a reference state to a different state that is different from the reference state. The second operation unit is different from the first operation unit. The control section terminates the first deceleration control according to a second operation. The second operation is an operation in which the rider operates the second operation unit to return the state to the reference state during the first deceleration control. The control section executes a second deceleration control, to control the deceleration, based on determination results of the determination section about the possibility of causing the collision, the control section executes the second deceleration at least one point in a period from the termination of the first deceleration control to an initiation of operating the first operation unit by the rider. Therefore, the first deceleration control is performed in line with the rider's intentions. In addition, an excess decrease of the deceleration, which may be caused during a period from the termination of the first deceleration control to the initiation of operating the first operation unit by the rider, can be suppressed based on the possibility of causing the collision. Thus, safety of the saddled vehicle is improved suitably.

BRIEF DESCRIPTION OF DRAWINGS

FIG. 1 is a schematic view illustrating an outline configuration of a saddled vehicle according to an embodiment of the present disclosure.

FIG. 2 is a schematic view illustrating an outline configuration of a brake system according to the embodiment of the present disclosure.

FIG. 3 is a schematic view illustrating an outline configuration of a handlebar and surroundings thereof according to the embodiment of the present disclosure.

FIG. 4 is a schematic view illustrating a rotational direction of an accelerator grip according to the embodiment of the present disclosure.

FIG. 5 is a block diagram illustrating an example of a functional configuration of a controller according to the embodiment of the present disclosure.

FIG. 6 is a flowchart illustrating an example of a processing procedure that is executed by the controller according to the embodiment of the present disclosure.

FIG. 7 is a graph illustrating exemplary transition of deceleration of the saddled vehicle when a second deceleration control according to the embodiment of the present disclosure is executed.

DETAILED DESCRIPTION

A description will hereinafter be made on a controller according to the present disclosure with reference to the drawings.

The following description will be made on the controller that is used for a two-wheeled motorcycle (see a saddled vehicle 100 in FIG. 1). However, a vehicle as a control target of the controller according to the present disclosure only needs to be a saddled vehicle, and may be a saddled vehicle other than the two-wheeled motorcycle. The saddled vehicle means a vehicle that a rider straddles. Examples of the saddled vehicle are motorcycles (a two-wheeled motor vehicle and a three-wheeled motor vehicle), a pedal-driven vehicle, and an all-terrain vehicle. The motorcycles include a vehicle having an engine as a power source, a vehicle having an electric motor as a power source, and the like. Examples of the motorcycles are a motorbike, a scooter, and an electric scooter. The pedal-driven vehicle means a vehicle capable of traveling forward on a road by a depression force applied to pedals by the rider. Examples of the pedal-driven vehicle are a normal pedal-driven vehicle, an electrically-assisted pedal-driven vehicle, and an electric pedal-driven vehicle.

In addition, the following description will be made on a case where the engine (more specifically, an engine 5 in FIG. 1, which will be described below) is mounted as a drive source that can output power for driving a wheel. However, as the drive source, a drive source other than the engine (for example, the electric motor) may be mounted, or plural drive sources may be mounted.

A configuration, operation, and the like, which will be described below, merely constitute one example. The controller and the control method according to the present disclosure are not limited to a case with such a configuration, such operation, and the like.

The same or similar description will appropriately be simplified or will not be made below. In the drawings, the same or similar members or portions will not be denoted by a reference sign or will be denoted by the same reference sign. A detailed structure will appropriately be illustrated in a simplified manner or will not be illustrated.

<Configuration of Saddled Vehicle>

A description will be made on a configuration of the saddled vehicle 100 according to the embodiment of the present disclosure with reference to FIG. 1 to FIG. 3.

FIG. 1 is a schematic view illustrating an outline configuration of the saddled vehicle 100. FIG. 2 is a schematic view illustrating an outline configuration of a brake system 10.

The saddled vehicle 100 is a two-wheeled motorcycle that corresponds to an example of the saddled vehicle according to the present disclosure. As illustrated in FIG. 1 and FIG. 2, the saddled vehicle 100 includes: a trunk 1; a handlebar 2 that is held by the trunk 1 in a freely turnable manner; a front wheel 3 that is held by the trunk 1 in the freely turnable manner with the handlebar 2; a rear wheel 4 that is held by the trunk 1 in a freely rotatable manner; the engine 5; the brake system 10; a surrounding environment sensor 41; a front-wheel rotational frequency sensor 42; and a rear-wheel rotational frequency sensor 43. In this embodiment, a controller (ECU) 60 is provided to a hydraulic pressure control unit 50 in the brake system 10, which will be described later.

The engine 5 corresponds to an example of the drive source for the saddled vehicle 100, and can output power for driving the wheel (more specifically, the rear wheel 4). For example, the engine 5 is provided with: one or plural cylinders, each of which is formed with a combustion chamber therein; a fuel injector that injects fuel into the respective combustion chamber; and an ignition plug. When the fuel is injected from the fuel injector, air-fuel mixture containing air and the fuel is produced in the combustion chamber, and the air-fuel mixture is then ignited by the ignition plug and burned. Consequently, a piston provided in the cylinder reciprocates to cause a crankshaft to rotate. In addition, a throttle valve is provided to an intake pipe of the engine 5, and an intake air amount for the combustion chamber varies according to a throttle opening amount as an opening amount of the throttle valve.

As illustrated in FIG. 1 and FIG. 2, the brake system 10 includes: a first brake operation unit 11; a front-wheel brake mechanism 12 that brakes the front wheel 3 in an interlocking manner with at least the first brake operation unit 11; a second brake operation unit 13; and a rear-wheel brake mechanism 14 that brakes the rear wheel 4 in an interlocking manner with at least the second brake operation unit 13. The brake system 10 also includes the hydraulic pressure control unit 50, and the front-wheel brake mechanism 12 and the rear-wheel brake mechanism 14 are partially included in the hydraulic pressure control unit 50. The hydraulic pressure control unit 50 is a unit that has a function of controlling a braking force to be generated on the front wheel 3 by the front-wheel brake mechanism 12 and a braking force to be generated on the rear wheel 4 by the rear-wheel brake mechanism 14.

The first brake operation unit 11 is provided to the handlebar 2 and is operated by the rider's hand. The first brake operation unit 11 is a brake lever, for example. The second brake operation unit 13 is provided to a lower portion of the trunk 1 and is operated by the rider's foot. The second brake operation unit 13 is a brake pedal, for example. The first brake operation unit 11 and the second brake operation unit 13 each correspond to an example of the first operation unit according to the present disclosure that accepts a brake operation by the rider.

Each of the front-wheel brake mechanism 12 and the rear-wheel brake mechanism 14 includes: a master cylinder 21 in which a piston (not illustrated) is installed; a reservoir 22 that is attached to the master cylinder 21; a brake caliper 23 that is held by the trunk 1 and has a brake pad (not illustrated); a wheel cylinder 24 that is provided to the brake caliper 23; a primary channel 25 through which a brake fluid in the master cylinder 21 flows into the wheel cylinder 24; a secondary channel 26 through which the brake fluid in the wheel cylinder 24 is released; and a supply channel 27 through which the brake fluid in the master cylinder 21 is supplied to the secondary channel 26.

An inlet valve (EV) 31 is provided to the primary channel 25. The secondary channel 26 bypasses a portion of the primary channel 25 between the wheel cylinder 24 side and the master cylinder 21 side of the inlet valve 31. The secondary channel 26 is sequentially provided with an outlet valve (AV) 32, an accumulator 33, and a pump 34 from an upstream side. Between an end on the master cylinder 21 side of the primary channel 25 and a portion of the primary channel 25 to which a downstream end of the secondary channel 26 is connected, a first valve (USV) 35 is provided. The supply channel 27 communicates between the master cylinder 21 and a portion on a suction side of the pump 34 in the secondary channel 26. A second valve (HSV) 36 is provided to the supply channel 27.

The inlet valve 31 is an electromagnetic valve that is opened in an unenergized state and is closed in an energized state, for example. The outlet valve 32 is an electromagnetic valve that is closed in an unenergized state and opened in an energized state, for example. The first valve 35 is an electromagnetic valve that is opened in an unenergized state and is closed in an energized state, for example. The second valve 36 is an electromagnetic valve that is closed in an unenergized state and is opened in an energized state, for example.

The hydraulic pressure control unit 50 includes: components such as the inlet valves 31, the outlet valves 32, the accumulators 33, the pumps 34, the first valves 35, and the second valves 36 used to control a brake hydraulic pressure; a base body 51 to which those components are provided and in which channels constituting the primary channels 25, the secondary channels 26, and the supply channels 27 are formed; and the controller 60.

The base body 51 may be formed of one member or may be formed of plural members. In addition, in the case where the base body 51 is formed of the plural members, the components may separately be provided to the different members.

The controller 60 controls operation of each of the components in the hydraulic pressure control unit 50. As a result, the braking force to be generated on the front wheel 3 by the front-wheel brake mechanism 12 and the braking force to be generated on the rear wheel 4 by the rear-wheel brake mechanism 14 are controlled.

For example, during normal time, that is, when a first deceleration control and a second deceleration control, which will be described below, are not executed, the controller 60 opens the inlet valves 31, closes the outlet valves 32, opens the first valves 35, and closes the second valves 36. When the first brake operation unit 11 is operated in such a state, in the front-wheel brake mechanism 12, the piston (not illustrated) in the master cylinder 21 is pressed to increase the hydraulic pressure of the brake fluid in the wheel cylinder 24, the brake pad (not illustrated) of the brake caliper 23 is then pressed against a rotor **3*a* of the front wheel 3, and the braking force is thereby generated on the front wheel 3. Meanwhile, when the second brake operation unit 13 is operated, in the rear-wheel brake mechanism 14, the piston (not illustrated) in the master cylinder 21 is pressed to increase the hydraulic pressure of the brake fluid in the wheel cylinder 24, the brake pad (not illustrated) of the brake caliper 23 is then pressed against a rotor 4*a* of the rear wheel 4, and the braking force is thereby generated on the rear wheel 4**.

The surrounding environment sensor 41 detects surrounding environment information on surrounding environment of the saddled vehicle 100. For example, the surrounding environment sensor 41 is provided to a front portion of the trunk 1 of the saddled vehicle 100, and detects the surrounding environment information in front of the saddled vehicle 100. The surrounding environment information detected by the surrounding environment sensor 41 is output to the controller 60.

The surrounding environment information detected by the surrounding environment sensor 41 may be information on a distance to or an orientation of a target object located around the saddled vehicle 100 (for example, a relative position, a relative distance, a relative speed, relative acceleration, or the like), or may be a characteristic of the target object located around the saddled vehicle 100 (for example, a type of the target object, a shape of the target object itself, a mark on the target object, or the like). Examples of the surrounding environment sensor 41 are a radar, a Lidar sensor, an ultrasonic sensor, and a camera.

However, the surrounding environment information can also be detected by a surrounding environment sensor mounted to another vehicle or by an infrastructure facility. In other words, the controller 60 can also acquire the surrounding environment information via wireless communication with the other vehicle or the infrastructure facility.

The front-wheel rotational frequency sensor 42 is a wheel rotational frequency sensor that detects a rotational frequency of the front wheel 3 (for example, a rotational frequency of the front wheel 3 per unit time [rpm], a travel distance of the front wheel 3 per unit time [km/h], or the like), and outputs a detection result. The front-wheel rotational frequency sensor 42 may detect another physical quantity that can substantially be converted to the rotational frequency of the front wheel 3. The front-wheel rotational frequency sensor 42 is provided to the front wheel 3.

The rear-wheel rotational frequency sensor 43 is a wheel rotational frequency sensor that detects a rotational frequency of the rear wheel 4 (for example, a rotational frequency of the rear wheel 4 per unit time [rpm], a travel distance of the rear wheel 4 per unit time [km/h], or the like), and outputs a detection result. The rear-wheel rotational frequency sensor 43 may detect another physical quantity that can substantially be converted to the rotational frequency of the rear wheel 4. The rear-wheel rotational frequency sensor 43 is provided to the rear wheel 4.

A further detailed description will herein be made on a configuration of the handlebar 2 and surroundings thereof with reference to FIG. 3 and FIG. 4. FIG. 3 is a schematic view illustrating an outline configuration of the handlebar 2 and the surroundings thereof. More specifically, FIG. 3 is a view in which an upper front portion of the trunk 1 of the saddled vehicle 100 is seen from above vertically.

As illustrated in FIG. 3, the handlebar 2 includes a right grip 2R and a left grip 2L. The handlebar 2 extends in a vehicle width direction. The right grip 2R is formed in a right end portion of the handlebar 2 and is grasped by the rider's right hand during travel. The left grip 2L is formed in a left end portion of the handlebar 2 and is grasped by the rider's left hand during the travel. In particular, the right grip 2R is an accelerator grip that is used for an accelerator operation by the rider (that is, an operation to accelerate the saddled vehicle 100). An operation to rotate the accelerator grip corresponds to the accelerator operation. Hereafter, the right grip 2R will also be referred to as the accelerator grip 2R.

The first brake operation unit 11 is provided near the right grip (the accelerator grip) 2R. The rider can grip the first brake operation unit 11 with his/her right hand. An operation to grip the first brake operation unit 11 corresponds to a brake operation (that is, an operation to decelerate the saddled vehicle 100). An operation to depress the above-described second brake operation unit 13 also corresponds to the brake operation. A clutch operation unit 15 is provided near the left grip 2L. The clutch operation unit 15 is a clutch lever, for example. The rider can grip the clutch operation unit 15 with his/her left hand. The operation to grip the clutch operation unit 15 corresponds to a clutch operation (that is, an operation to release a clutch that connects/disconnects power transmission from the engine 5 to a drive wheel).

As illustrated in FIG. 3, a display device 70 is mounted to the saddled vehicle 100. The display device 70 is a device that visually presents various types of information. For example, the display device 70 may show an object indicative of a vehicle speed, an object indicative of a remaining amount of the fuel, and the like. In the example illustrated in FIG. 3, the display device 70 is provided in front of the handlebar 2 in the saddled vehicle 100.

A further detailed description will herein be made on the accelerator grip 2R of the handlebar 2 with reference to FIG. 4. FIG. 4 is a schematic view illustrating the rotational direction of the accelerator grip 2R. More specifically, FIG. 4 is a view in which the accelerator grip 2R is seen in a direction of arrow A in FIG. 3 (that is, a view in which the accelerator grip 2R is seen from a vehicle right side along an axial direction thereof).

The accelerator grip 2R corresponds to an example of the second operation unit according to the present disclosure used for the rider's operation to execute the first deceleration control, which will be described below. The second operation unit is a different operation unit from the above-described first operation unit (for example, the first brake operation unit 11 and the second brake operation unit 13).

More specifically, the accelerator grip 2R has a cylindrical or columnar shape, and can be rotated about a center axis of the accelerator grip 2R. The accelerator grip 2R is movable so that a rotational position of the accelerator grip 2R returns to a reference position P0 while being unloaded, i.e., while being in an unloaded state. In other words, in the unloaded state, the accelerator grip 2R does not receive a load from external devices. Such a structure can be implemented by using a restoring force of a spring of the like, for example. In this case, an urging force that returns the rotational position of the accelerator grip 2R to the reference position P0 can be applied to the accelerator grip 2 in either a first direction D1 as a counterclockwise direction when seen from the vehicle right side or a second direction D2 as a clockwise direction when seen from the vehicle right side. In a state where the first deceleration control and the second deceleration control, which will be described below, are canceled, drive power generated to the saddled vehicle 100 is minimized when the rotational position of the accelerator grip 2R is the reference position P0. A state where the rotational position of the accelerator grip 2R is the reference position P0 corresponds to a reference state of the accelerator grip 2R.

In addition, in the state where the first deceleration control and the second deceleration control, which will be described below, are canceled, the drive power can be generated to the saddled vehicle 100 by rotating the accelerator grip 2R in the first direction D1 from the reference position P0. Here, the drive power generated to the saddled vehicle 100 is increased as a relative angle of the rotational position of the accelerator grip 2R to the reference position P0 is increased. For example, in the case where the rotational position of the accelerator grip 2R is a position P1 in FIG. 4 (more specifically, a position to which the accelerator grip 2R is rotated in the first direction D1 from the reference position P0 by an angle θ1), the drive power that corresponds to the angle θ1 is generated to the saddled vehicle 100.

In the state where the first deceleration control and the second deceleration control, which will be described below, are canceled and the drive power is generated to the saddled vehicle 100 (more specifically, a state where the rotational position of the accelerator grip 2R is located on the first direction D1 side from the reference position P0), the drive power is increased when the rider rotates the accelerator grip 2R in the first direction D1, and the drive power is reduced when the rider rotates the accelerator grip 2R in the second direction D2 as a reverse direction from the first direction D1.

The controller 60 maneuvers the saddled vehicle 100. For example, the controller 60 is partially or entirely constructed of a microcomputer, a microprocessor unit, or the like. Alternatively, the controller 60 may partially or entirely be constructed of a member in which firmware or the like can be updated, or may partially or entirely be a program module or the like that is executed by a command from a CPU or the like, for example. The controller 60 may be provided as a single unit or may be divided into plural units, for example.

FIG. 5 is a block diagram illustrating an example of a functional configuration of the controller 60. As illustrated in FIG. 5, the controller 60 includes an acquisition section 61, a control section 62, and a determination section 63, for example.

The acquisition section 61 acquires the information that is output from each of the devices mounted to the saddled vehicle 100, and outputs the acquired information to the control section 62 and the determination section 63. For example, the acquisition section 61 acquires information on the various detection results output from the surrounding environment sensor 41, the front-wheel rotational frequency sensor 42, and the rear-wheel rotational frequency sensor 43. In addition, for example, the acquisition section 61 acquires information on operation amounts of various operations accepted by the accelerator grip 2R, the first brake operation unit 11, the second brake operation unit 13, and the clutch operation unit 15 from these operation units. In the present specification, the acquisition of the information can include extraction, generation, and the like of the information.

The control section 62 includes a drive control section 62*a* and a brake control section 62*b*, for example.

The drive control section 62*a* controls the drive power that is transmitted to the wheel. More specifically, the drive control section 62*a* outputs a command to an engine control unit (not illustrated), which outputs a signal for controlling operation of each of the components (the throttle valve, the fuel injector, the ignition plug, and the like) in the engine 5, and thereby controls operation of the engine 5. In this way, the drive power transmitted from the engine 5 to the wheel is controlled, and acceleration of the saddled vehicle 100 is thereby controlled. The drive control section 62*a* may output the signal for controlling the operation of each of the components in the engine 5, so as to directly control the operation of each of the components in the engine 5.

The brake control section 62*b* controls the operation of each of the components in the hydraulic pressure control unit 50 of the brake system 10, and thereby controls the braking force generated on the wheels of the saddled vehicle 100. For example, the brake control section 62*b* brings the saddled vehicle 100 into a state where the inlet valve 31 is opened, the outlet valve 32 is closed, the first valve 35 is closed, and the second valve 36 is opened, and drives the pump 34 in such a state. In this way, the brake control section 62*b* increases the hydraulic pressure of the brake fluid in the wheel cylinder 24, and can thereby automatically increase the braking force on the wheel. As a result, deceleration of the saddled vehicle 100 is controlled. The brake control section 62*b* can separately control the braking force on the front wheel 3 and the braking force on the rear wheel 4 by separately controlling the operation of the front-wheel brake mechanism 12 and the operation of the rear-wheel brake mechanism 14.

The determination section 63 makes various determinations and outputs determination results to the control section 62. In particular, the determination section 63 can determine a possibility of causing a collision of the saddled vehicle 100 based on the surrounding environment information of the saddled vehicle 100.

As described above, the control section 62 can control the deceleration of the saddled vehicle 100 by controlling the operation of each of the devices mounted to the saddled vehicle 100. Here, the control section 62 can execute the first deceleration control and the second deceleration control as deceleration control for controlling the deceleration of the saddled vehicle 100. In this embodiment, safety of the saddled vehicle 100 is appropriately improved by the first deceleration control and the second deceleration control.

<Operation of Controller>

A description will be made on operation of the controller 60 according to the embodiment of the present disclosure with reference to FIG. 6 and FIG. 7.

FIG. 6 is a flowchart illustrating an example of a processing procedure that is executed by the controller 60. Step S101 in FIG. 6 corresponds to initiation of a control flow illustrated in FIG. 6.

When the control flow illustrated in FIG. 6 is initiated, in step S102, the determination section 63 determines whether a first operation has been performed. The first operation is an operation in which the rider changes the reference state of the accelerator grip 2R to a different state from the reference state. More specifically, the first operation is an operation in which the rider rotates the accelerator grip 2R in the second direction D2 from the reference position P0 illustrated in FIG. 4. In other words, the first operation is an operation to rotate the accelerator grip 2R in the same direction as a direction in the case of reducing the drive power in the accelerator operation.

For example, the first operation is an operation to rotate the accelerator grip 2R from the reference position P0 to a position P2 in FIG. 4 (more specifically, a position to which the accelerator grip 2R is rotated in the second direction D2 from the reference position P0 by an angle θ2). In this case, it is possible to suppress an erroneous determination that the first operation has been performed when the accelerator grip 2R is slightly rotated in the second direction D2 against the rider's intention. Here, the accelerator grip 2R may further be rotated to the second direction D2 side from the position P2.

If it is determined that the first operation has not been performed (step S102/NO), step S102 is repeated. On the other hand, if it is determined that the first operation has been performed (step S102/YES), the processing proceeds to step S103.

If it is determined YES in step S102, in step S103, the control section 62 executes the first deceleration control.

For example, in the first deceleration control, the control section 62 controls the deceleration of the saddled vehicle 100 based on the surrounding environment information of the saddled vehicle 100. For example, the control section 62 determines target deceleration based on an inter-vehicular distance between a preceding vehicle and the saddled vehicle 100 and a relative speed of the saddled vehicle 100 to the preceding vehicle. The inter-vehicular distance may mean a distance in a direction along a lane (more specifically, a travel lane of the saddled vehicle 100) or may mean a straight-line distance. Here, for example, the target deceleration is the deceleration at which a collision with the preceding vehicle can be avoided. In this case, the control section 62 determines, as the target deceleration, the greater deceleration as the inter-vehicular distance between the preceding vehicle and the saddled vehicle 100 is reduced. In addition, the control section 62 determines, as the target deceleration, the greater deceleration as the relative speed of the saddled vehicle 100 to the preceding vehicle is increased. Then, the control section 62 increases the deceleration of the saddled vehicle 100 to the target deceleration.

In the first deceleration control, the control section 62 controls the operation of each of the components in the hydraulic pressure control unit 50 of the brake system 10, so as to enable automatic generation of the braking force on the wheel of the saddled vehicle 100. As a result, even when the rider does not perform the brake operation by using the first brake operation unit 11 or the second brake operation unit 13, the deceleration of the saddled vehicle 100 can automatically be increased.

Here, such a case can be considered that, during execution of the first deceleration control, the rider performs the brake operation by using the first brake operation unit 11 or the second brake operation unit 13. In the case where the brake operation is performed by using the first brake operation unit 11, the braking force corresponding to the operation amount of the first brake operation unit 11 is applied to the front wheel 3. In the case where the brake operation is performed by using the second brake operation unit 13, the braking force corresponding to the operation amount of the second brake operation unit 13 is applied to the rear wheel 4. In the case where the rider performs the brake operation, just as described, for example, the control section 62 may increase the braking force on the front wheel 3 to be larger than the braking force corresponding to the operation amount of the first brake operation unit 11, or may increase the braking force on the rear wheel 4 to be larger than the braking force corresponding to the operation amount of the second brake operation unit 13. For example, when compared to a case where the brake operation using the first brake operation unit 11 or the second brake operation unit 13 is not performed, the deceleration that is generated on the saddled vehicle 100 in the first deceleration control may be increased by the deceleration that is generated by the braking force corresponding to the operation amount in the brake operation. The first deceleration control may compensate for shortfall in the braking force, which corresponds to the operation amount in the brake operation, relative to a target braking force (that is, a required amount of the braking force to generate the target deceleration).

In the first deceleration control, the control section 62 may increase the braking forces on both of the front wheel 3 and the rear wheel 4, or may increase the braking force on only one of the front wheel 3 and the rear wheel 4.

For example, in the first deceleration control, the control section 62 may control the deceleration of the saddled vehicle 100 without using the surrounding environment information of the saddled vehicle 100. For example, in the first deceleration control, the control section 62 may generate a specified magnitude of the deceleration to the saddled vehicle 100.

Following step S103, in step S104, the determination section 63 determines whether a second operation has been performed. The second operation is an operation in which the rider returns the accelerator grip 2R to the reference state. More specifically, the second operation is an operation in which the rider rotates the accelerator grip 2R in the first direction D1 to the reference position P0 illustrated in FIG. 4. For example, in the case where the accelerator grip 2R is rotated to the position P2 in FIG. 4 by the first operation, the second operation is an operation to rotate the accelerator grip 2R from the position P2 in FIG. 4 to the reference position P0.

As described above, the accelerator grip 2R is movable so that the rotational position thereof returns to the reference position P0 while being unloaded, i.e., in the unloaded state. Thus, when the rider cancels the first operation (more specifically, releases his/her hand performing the first operation from the accelerator grip 2R), the accelerator grip 2R can be rotated in the first direction D1 to the reference position P0. Just as described, the second operation may be such an operation that the rider cancels the first operation to bring the accelerator grip 2R into the unloaded state.

If it is determined that the second operation has not been performed (step S104/NO), the processing returns to step S103. On the other hand, if it is determined that the second operation has been performed (step S104/YES), the processing proceeds to step S105.

If it is determined YES in step S104, in step S105, the control section 62 terminates the first deceleration control.

Next, in step S106, the determination section 63 determines whether the possibility of causing a collision of the saddled vehicle 100 is higher than a reference (for example, a reference value). Here, the determination section 63 determines the possibility of causing a collision of the saddled vehicle 100 based on the surrounding environment information of the saddled vehicle 100.

For example, the determination section 63 determines the possibility of causing a collision based on the inter-vehicular distance between the preceding vehicle and the saddled vehicle 100 and the relative speed of the saddled vehicle 100 to the preceding vehicle. In this case, the determination section 63 can estimate that the possibility of causing a collision is higher as the inter-vehicular distance between the preceding vehicle and the saddled vehicle 100 is reduced. In addition, the determination section 63 can estimate that the possibility of causing a collision is higher as the relative speed of the saddled vehicle 100 to the preceding vehicle is increased. In the case where the thus-estimated possibility of causing a collision is higher than the specified reference, it is determined YES in step S106, and the processing proceeds to step S107. On the other hand, in the case where the estimated possibility of causing a collision is lower than the specified reference, it is determined NO in step S106, and the processing returns to step S102. In the case where the estimated possibility of causing a collision coincides with the specified reference, the processing may proceed to step S107 or may return to step S102.

If it is determined YES in step S106, in step S107, the control section 62 executes the second deceleration control, and the processing returns to step S102.

In the second deceleration control, the control section 62 controls the operation of each of the components in the hydraulic pressure control unit 50 of the brake system 10, and thereby automatically controls the braking force on the wheel of the saddled vehicle 100. As a result, even in the case where the rider does not perform the brake operation by using the first brake operation unit 11 or the second brake operation unit 13, the deceleration of the saddled vehicle 100 can automatically be controlled.

Here, the second deceleration control may be executed in a situation where the rider performs the brake operation by using the first brake operation unit 11 or the second brake operation unit 13. For example, in a state where the brake operation using the second brake operation unit 13 is performed and the braking force corresponding to the operation amount of the second brake operation unit 13 is applied to the rear wheel 4, the second deceleration control may compensate for shortfall in the braking force on the rear wheel 4 relative to the target braking force.

In the second deceleration control, the control section 62 may control the braking forces on both of the front wheel 3 and the rear wheel 4, or may control the braking force on only one of the front wheel 3 and the rear wheel 4.

FIG. 7 is a graph illustrating exemplary transition of the deceleration of the saddled vehicle 100 when the second deceleration control is executed. In FIG. 7, a vertical axis represents the deceleration of the saddled vehicle 100, and a horizontal axis represents time. In the example in FIG. 7, the second operation is performed at a time point T1. In other words, prior to the time point T1, the first operation is performed, and the first deceleration control is executed. Then, at the time point T1, the first deceleration control is terminated.

Lines L11, L12, L13 in FIG. 7 each indicate the exemplary transition of the deceleration in the case where the second deceleration control is executed at the time point T1 onward. Meanwhile, a line L21 indicates the exemplary transition of the deceleration in the case where the second deceleration control is not executed at the time point T1 onward. As indicated by the line L21 in FIG. 7, in the case where the second deceleration control is not executed at the time point T1, at which the first deceleration control is terminated, onward, the deceleration of the saddled vehicle 100 is reduced rapidly.

For example, as indicated by the line L11 in FIG. 7, in the second deceleration control, the control section 62 may increase the deceleration of the saddled vehicle 100 to be greater than that during the execution of the first deceleration control. The example of the line L11 corresponds to an example in which automatic emergency brake control is executed as the second deceleration control. The automatic emergency brake control is control for generating the deceleration, which corresponds to the possibility of causing a collision determined based on the surrounding environment information, on the saddled vehicle 100. In the automatic emergency brake control, the control section 62 generates the greater deceleration on the saddled vehicle 100 as the inter-vehicular distance between the preceding vehicle and the saddled vehicle 100 is reduced. In addition, the control section 62 generates the greater deceleration on the saddled vehicle 100 as the relative speed of the saddled vehicle 100 to the preceding vehicle is increased. Just as described, in the second deceleration control, the control section 62 may control the deceleration of the saddled vehicle 100 based on the surrounding environment information.

For example, as indicated by the line L12 in FIG. 7, in the second deceleration control, the control section 62 may maintain the deceleration of the saddled vehicle 100 at the deceleration at a time point corresponding to the termination of the first deceleration control (for example, the time point T1). For example, the control section 62 keeps the hydraulic pressure of the brake fluid in the wheel cylinder 24 by closing both of the inlet valve 31 and the outlet valve 32, and can thereby keep the braking force generated on the wheel.

For example, at the time point T1 onward, the control section 62 keeps closing both of the inlet valve 31 and the outlet valve 32, and can thereby maintain the deceleration of the saddled vehicle 100 at the deceleration at the time point T1. Here, a time point that corresponds to the termination of the first deceleration control may strictly match or may not match the time point T1, at which the first deceleration control is terminated.

For example, as indicated by the line L13 in FIG. 7, in the second deceleration control, the control section 62 may reduce the deceleration of the saddled vehicle 100 at a smaller reduction gradient than a reduction gradient of the deceleration in the case where the second deceleration control is not executed (for example, the example of the line L21). For example, the control section 62 opens both of the first valve 35 and the second valve 36, drives the pump 34 in such a state, and thereby reduces the braking force on the wheel. In addition, the control section 62 can control the reduction gradient of the braking force on the wheel by controlling a rotational frequency of the pump 34 in this state, for example.

Here, in the second deceleration control, the control section 62 may control the deceleration of the saddled vehicle 100 based on a state amount of at least one of the first operation and the second operation. The state amount of the first operation is an index indicating an operation amount in the first operation (more specifically, a rotation angle of the accelerator grip 2R). The state amount of the second operation is an index indicating an operation amount in the second operation (more specifically, the rotation angle of the accelerator grip 2R).

For example, it is expected that the rider is likely to strongly desire the generation of the greater deceleration on the saddled vehicle 100 as the operation amount or a magnitude of a change in the operation amount immediately before the termination of the first operation is increased. For this reason, in the second deceleration control, the control section 62 may increase the deceleration of the saddled vehicle 100 as the operation amount or the magnitude of the change in the operation amount immediately before the termination of the first operation (for example, in a specified period including a time point at which the first operation is terminated) is increased. For example, in the case where the rotation angle of the accelerator grip 2R immediately before the termination of the first operation is larger than the angle θ2 in FIG. 4, the control section 62 may change the deceleration of the saddled vehicle 100 according to an angle by which the accelerator grip 2R is further rotated beyond the position P2 in FIG. 4.

In addition, for example, it is expected that the rider is likely to strongly desire the generation of the greater deceleration on the saddled vehicle 100 as the operation amount or the magnitude of the change in the operation amount immediately before the initiation of the second operation is increased. For this reason, in the second deceleration control, the control section 62 may increase the deceleration of the saddled vehicle 100 as the operation amount or the magnitude of the change in the operation amount immediately before the initiation of the second operation (for example, in a specified period including a time point at which the second operation is initiated) is increased. For example, the control section 62 may change the deceleration of the saddled vehicle 100 according to a change speed of the rotation angle of the accelerator grip 2R immediately before the initiation of the second operation.

As described above, the second deceleration control is executed in the case where the possibility of causing a collision of the saddled vehicle 100 is higher than the reference. In this case, it is assumed that, after the second operation, the rider performs the brake operation by using the first brake operation unit 11 or the second brake operation unit 13. Here, in the case where the rider performs the brake operation by using the first brake operation unit 11 or the second brake operation unit 13 after the initiation of the second deceleration control, the control section 62 may terminate the second deceleration control. Furthermore, in this case, another deceleration control (for example, deceleration control that compensates for shortfall in the deceleration generated according to the brake operation using the first brake operation unit 11 or the second brake operation unit 13 relative to the target deceleration, at which the collision can be avoided based on the determination result of the possibility of causing a collision) that differs from the second deceleration control may be executed.

The second deceleration control may be terminated in the case where a different condition from a condition that the rider performs the brake operation by using the first brake operation unit 11 or the second brake operation unit 13 is satisfied. For example, in the case where the automatic emergency brake control is executed as the second deceleration control and the possibility of causing a collision falls below the reference, the control section 62 terminates the automatic emergency brake control. In the case where the automatic emergency brake control is executed as the second deceleration control, and the control section 62 determines that the rider has the intention of avoiding the collision based on a lean angle of the saddled vehicle 100, or the like, the control section 62 may terminate the automatic emergency brake control. Here, the second deceleration control may be terminated before the rider performs the brake operation by using the first brake operation unit 11 or the second brake operation unit 13.

Just as described, the second deceleration control only needs to be executed at least at one point in a period from the termination of the first deceleration control to the operation of the first operation unit (for example, the first brake operation unit 11 or the second brake operation unit 13) by the rider. The second deceleration control can be executed for certain duration of a time. In other words, the second deceleration control only needs to be executed at least for certain duration in the period from the termination of the first deceleration control to the operation of the first operation unit by the rider.

As described above, the control section 62 initiates the first deceleration control according to the first operation in which the rider moves the accelerator grip 2R from the reference state to the different state that is different from the reference state. Then, during the execution of the first deceleration control, the control section 62 terminates the first deceleration control according to the second operation in which the rider moves the accelerator grip 2R to return to the reference state. Thereafter, at least at one point in the period from the termination of the first deceleration control to the operation of the first brake operation unit 11 or the second brake operation unit 13 by the rider, the control section 62 executes the second deceleration control based on the determination result of the possibility of causing a collision by the determination section 63. For example, in the control flow illustrated in FIG. 6, while the first operation is performed, the control section 62 executes the first deceleration control. Then, at timing of performing the second operation, the control section 62 terminates the first deceleration control. Then, after the termination of the first deceleration control, the control section 62 executes the second deceleration control based on the determination result of the possibility of causing a collision by the determination section 63.

For example, in such a case that particular processing is executed according to a particular operation, timing at which the particular operation is performed may precisely match or may not match timing at which the particular processing is executed. For example, timing at which the first operation is initiated may precisely match or may not match timing at which the first deceleration control is initiated. In addition, for example, timing at which the second operation is performed may precisely match or may not match timing at which the first deceleration control is terminated.

According to this embodiment, the rider can initiate and terminate the first deceleration control by performing the first operation and the second operation. Therefore, it is possible to execute the first deceleration control in line with the rider's intention. For example, in the case where the saddled vehicle 100 approaches the preceding vehicle in a situation where neither the accelerator operation nor the brake operation is performed and the saddled vehicle 100 is decelerated by engine braking, the first deceleration control can be executed at intended timing by performing the first operation and the second operation without using the first brake operation unit 11 or the second brake operation unit 13. In this way, with the simple operations, the first deceleration control can be executed in line with the rider's intention. In particular, a posture of the saddled vehicle 100 tends to become unstable when compared to a four-wheeled automobile or the like. Accordingly, in the case where the deceleration control is executed at timing unintended by the rider, the safety is possibly impaired. Therefore, it is important to execute the first deceleration control in line with the rider's intention from a perspective of improving the safety.

Here, such a situation possibly arises that, in the case where the possibility of causing a collision of the saddled vehicle 100 is higher than the reference even with the execution of the first deceleration control, the first deceleration control is terminated by the second operation, and the brake operation is performed by using the first brake operation unit 11 or the second brake operation unit 13. In the case where the second deceleration control is executed in such a situation, it is possible to suppress an excessive reduction in the deceleration in a period from the termination of the first deceleration control to a time point at which the brake operation is performed by using the first brake operation unit 11 or the second brake operation unit 13. As described above, according to this embodiment, it is possible to appropriately improve the safety of the saddled vehicle 100.

The above description has been made on the example in which the second operation unit used in the first operation and the second operation as the operations for executing the first deceleration control is the accelerator grip 2R. However, the second operation unit according to the present disclosure may be an operation unit other than the accelerator grip 2R (that is, any of various operation units other than the operation unit that accepts the accelerator operation). For example, the second operation unit according to the present disclosure may be rotatable about an axis other than the center axis of the second operation unit. In addition, for example, the second operation unit according to the present disclosure may not have the cylindrical or columnar shape. Furthermore, for example, the second operation unit according to the present disclosure may be translatable rather than rotatable. In the case where a translatable second operation unit is used in the first operation and the second operation, the first operation and the second operation may each be an operation that translates the second operation unit.

<Effects of Controller>

A description will be made on effects of the controller 60 according to the embodiment of the present disclosure.

In the controller 60, the control section 62 initiates the first deceleration control according to the first operation in which the rider of the saddled vehicle 100 operates the second operation unit (e.g., the accelerator grip 2R) so that the second operation unit moves from the reference state to the different state that is different from the reference state. Then, during the execution of the first deceleration control, the control section 62 terminates the first deceleration control according to the second operation in which the rider operates the second operation unit to return to the reference state. Thereafter, at least at one point in the period from the termination of the first deceleration control to the operation of the first operation unit (for example, the first brake operation unit 11 or the second brake operation unit 13) by the rider, the control section 62 executes the second deceleration control based on the determination result of the possibility of causing a collision by the determination section 63. In this way, it is possible to execute the first deceleration control in line with the rider's intention and to appropriately suppress the excessive reduction in the deceleration in the period from the termination of the first deceleration control to the operation of the first operation unit by the rider according to the possibility of causing a collision. Therefore, it is possible to appropriately improve the safety of the saddled vehicle 100.

Preferably, in the controller 60, the second operation unit is movable to return to the reference state while being unloaded, i.e., in the unloaded state. The second operation is the operation in which the rider cancels the first operation so that the second operation unit becomes unloaded, i.e., so that the second operation unit is brought into the unloaded state. In this way, it is possible to avoid the rider's effort of performing the second operation. Thus, the first deceleration control can be terminated by the simple operation. Therefore, it is possible to further appropriately improve the safety of the saddled vehicle 100.

Preferably, in the controller 60, the second operation unit is the accelerator grip 2R. In the state where at least the first deceleration control and the second deceleration control are canceled, the drive power generated on the saddled vehicle 100 is increased when the rider rotates the accelerator grip 2R in the first direction, and the drive power is reduced when the rider rotates the accelerator grip 2R in the second direction as the reverse direction of the first direction. Here, during the travel, a state where the accelerator grip 2R is grasped by the rider's hand is basically maintained. Thus, in the case where the accelerator grip 2R is used as the second operation unit, it is possible to avoid the rider's effort of moving his/her hand from the accelerator grip 2R to the other operation unit at the time of performing the first operation. Therefore, it is possible to further appropriately improve the safety of the saddled vehicle 100.

Preferably, in the controller 60, the first operation is the operation to rotate the accelerator grip 2R in the second direction, and the second operation is the operation to rotate the accelerator grip 2R in the first direction. Accordingly, the first operation can be performed by rotating the accelerator grip 2R in the same direction as the direction in the case of reducing the drive power in the accelerator operation. As a result, the rider can easily and appropriately distinguish between the accelerator operation using the accelerator grip 2R and the first operation. Therefore, the first operation can be performed without the erroneous operation.

Preferably, in the controller 60, in the reference state, the rotational position of the accelerator grip 2R is the position where the drive power generated on the saddled vehicle 100 is minimized in the state where the first deceleration control and the second deceleration control are canceled. Accordingly, the rider can easily and appropriately distinguish between the accelerator operation using the accelerator grip 2R and the first operation. Therefore, the first operation can be performed without the erroneous operation.

Preferably, in the second deceleration control, the control section 62 of the controller 60 increases the deceleration of the saddled vehicle 100 to be greater than that during the execution of the first deceleration control. In this way, in the second deceleration control, it is possible to effectively suppress the excessive reduction in the inter-vehicular distance between the saddled vehicle 100 and the preceding vehicle, and thus to effectively avoid the collision with the preceding vehicle.

Preferably, in the second deceleration control, the control section 62 of the controller 60 maintains the deceleration of the saddled vehicle 100 at the deceleration at the time point corresponding to the termination of the first deceleration control. In this way, it is possible to suppress the behavior change of the saddled vehicle 100 that is associated with the change in the deceleration of the saddled vehicle 100 after the termination of the first deceleration control.

Preferably, in the second deceleration control, the control section 62 of the controller 60 reduces the deceleration of the saddled vehicle 100 at the smaller reduction gradient than the reduction gradient of the deceleration in the case where the second deceleration control is not executed. In this way, it is possible to suppress the rider from feeling a sense of discomfort that is caused by an excessive increase in a difference between the deceleration in the case where the second deceleration control is not executed and the deceleration in the case where the second deceleration control is executed.

Preferably, in the second deceleration control, the control section 62 of the controller 60 controls the deceleration of the saddled vehicle 100 based on the surrounding environment information. In this way, in the second deceleration control, it is possible to appropriately suppress the excessive reduction in the inter-vehicular distance between the saddled vehicle 100 and the preceding vehicle according to the surrounding environment information, and thus to appropriately avoid the collision with the preceding vehicle.

Preferably, in the second deceleration control, the control section 62 of the controller 60 controls the deceleration of the saddled vehicle 100 based on the state amount in at least one of the first operation and the second operation. In this way, in the second deceleration control, it is possible to control the deceleration of the saddled vehicle 100 in line with the rider's intention.

Preferably, in the first deceleration control, the control section 62 of the controller 60 controls the deceleration of the saddled vehicle 100 based on the surrounding environment information. In this way, in the first deceleration control, it is possible to appropriately suppress the excessive reduction in the inter-vehicular distance between the saddled vehicle 100 and the preceding vehicle according to the surrounding environment information, and thus to appropriately avoid the collision with the preceding vehicle.

The present disclosure is not limited to the embodiment that has been described. For example, only a part of the embodiment may be implemented.

REFERENCE SIGNS LIST

1: Trunk
2: Handlebar
2L: Left grip
2R: Right grip (accelerator grip)
3: Front wheel
3*a*: Rotor
4: Rear wheel
4*a*: Rotor
5: Engine
10: Brake system
11: First brake operation unit
12: Front-wheel brake mechanism
13: Second brake operation unit
14: Rear-wheel brake mechanism
15: Clutch operation unit
21: Master cylinder
22: Reservoir
23: Brake caliper
24: Wheel cylinder
25: Primary channel
26: Secondary channel
27: Supply channel
31: Inlet valve
32: Outlet valve
33: Accumulator
34: Pump
35: First valve
36: Second valve
41: Surrounding environment sensor
42: Front-wheel rotational frequency sensor
43: Rear-wheel rotational frequency sensor
50: Hydraulic pressure control unit
51: Base body
60: Controller
61: Acquisition section
62: Control section
62*a*: Drive control section
62*b*: Brake control section
63: Determination section
70: Display device
100: Saddled vehicle
D1: First direction
D2: Second direction
P0: Reference position

The invention claimed is:

1. A controller (60) that is configured to maneuver a saddled vehicle (100), the saddled vehicle (100) including a first brake operation unit (11, 13) configured to accept a brake operation by a rider, the controller comprising:

a control section (62) that is configured to control a deceleration of the saddled vehicle (100) by controlling a brake system (10) of the saddled vehicle (100) that generates braking force; and a determination section (63) that is configured to determine a possibility of causing a collision of the saddled vehicle (100) based on surrounding environment information of the saddled vehicle (100), wherein the control section (62) is configured to:

initiate a first deceleration control by operating the brake system (10), to control the deceleration, according to a first operation, the first operation is an operation in which the rider operates a second operation unit (2R) to change a state of the second operation unit (2R) from a reference state to a different state that is different from the reference state, the second operation unit (2R) is different from the first brake operation unit (11, 13);

terminate the first deceleration control according to a second operation, the second operation is an operation in which the rider operates the second operation unit (2R) to return the state to the reference state during the first deceleration control; and execute a second deceleration control by operating the brake system (10), to control the deceleration, based on determination results of the determination section (63) about the possibility of causing the collision, the control section executes the second deceleration at least one point in a period from the termination of the first deceleration control to an initiation of operating the first brake operation unit (11, 13) by the rider, wherein the second operation unit (2R) is an accelerator grip that is rotatable in a first direction and a second direction opposite to the first direction, and at least while the first deceleration control and the second deceleration control are being canceled, the accelerator grip:

generates a drive power to the saddled vehicle (100) when the rider rotates the accelerator grip in the first direction, and reduces the drive power when the rider rotates the accelerator grip in the second direction, and wherein the accelerator grip (2R), in the reference state, is at a rotational position where the drive power generated to the saddled vehicle (100) is minimized while the first deceleration control and the second deceleration control are canceled.

2. The controller according to claim 1, wherein the second operation unit (2R) is movable to return to the reference state while being unloaded, and the rider cancels the first operation in the second operation so that the second operation unit (2R) becomes unloaded.

3. The controller according to claim 1, wherein the first operation is an operation to rotate the accelerator grip (2R) in the second direction, and the second operation is an operation to rotate the accelerator grip (2R) in the first direction.

4. The controller according to claim 1, wherein the control section (62), in the second deceleration control, increases the deceleration as compared to the deceleration caused during the first deceleration control.

5. The controller according to claim 1, wherein the control section (62), in the second deceleration control, maintains the deceleration at a deceleration caused at a point corresponding to the termination of the first deceleration control.

6. The controller according to claim 1 wherein the control section (62), in the second deceleration control, reduces the deceleration at a reduction gradient that is smaller than a reduction gradient of the deceleration in a case where the second deceleration control is not executed.

7. The controller according to claim 1, wherein the control section (62), in the second deceleration control, controls the deceleration based on the surrounding environment information.

8. The controller according to claim 1, wherein the control section (62), in the second deceleration control, controls the deceleration based on a state amount of at least one of the first operation and the second operation.

9. The controller according to claim 1, wherein the control section (62), in the first deceleration control, controls the deceleration based on the surrounding environment information.

10. A control method for maneuvering a saddled vehicle (100) that includes a first brake operation unit (11, 13) configured to accept a brake operation by a rider, the control method comprising:

controlling, using a control section (62) of a controller (60), a deceleration of the saddled vehicle (100) by controlling a brake system (10) of the saddled vehicle (100) that generates braking force; and determining, using a determination section (63) of the controller (60), a possibility of causing a collision of the saddled vehicle (100) based on surrounding environment information of the saddled vehicle (100), wherein the control section (62) is configured to:

initiate a first deceleration control by operating the brake system (10), to control the deceleration, according to a first operation, the first operation is an operation in which the rider operates a second operation unit (2R) to change a state of the second operation unit (2R) from a reference state to a different state that is different from the reference state, the second operation unit (2R) is different from the first brake operation unit (11, 13);

terminate the first deceleration control according to a second operation, the second operation is an operation in which the rider operates the second operation unit (2R) to return the state to the reference state during the first deceleration control; and execute a second deceleration control by operating the brake system (10), to control the deceleration, based on determination results of the determination section (63) about the possibility of causing the collision, the control section executes the second deceleration at least one point in a period from the termination of the first deceleration control to an initiation of operating the first brake operation unit (11, 13) by the rider, wherein the second operation unit (2R) is an accelerator grip that is rotatable in a first direction and a second direction opposite to the first direction, and at least while the first deceleration control and the second deceleration control are being canceled, the accelerator grip generates a drive power to the saddled vehicle (100) when the rider rotates the accelerator grip in the first direction, and reduces the drive power when the rider rotates the accelerator grip in the second direction, and wherein the accelerator grip (2R), in the reference state, is at a rotational position where the drive power generated to the saddled vehicle (100) is minimized while the first deceleration control and the second deceleration control are canceled.

* * * * *